Oct. 1, 1968  D. M. WEITZNER  3,403,591
ELECTRICALLY OPERATED MUSIC CUING SYSTEM
Filed July 26, 1965  8 Sheets-Sheet 4

INVENTOR
Dorothea M. Weitzner

BY
Polachek & Saulsbury
ATTORNEYS.

Oct. 1, 1968 D. M. WEITZNER 3,403,591
ELECTRICALLY OPERATED MUSIC CUING SYSTEM
Filed July 26, 1965 8 Sheets-Sheet 5

INVENTOR
Dorothea M. Weitzner
BY
Polachek & Saulsbury
ATTORNEYS.

Oct. 1, 1968

D. M. WEITZNER

3,403,591

ELECTRICALLY OPERATED MUSIC CUING SYSTEM

Filed July 26, 1965

INVENTOR
*Dorothea M. Weitzner*

BY *Polachek & Saulsbury*
ATTORNEYS 3,403,591
ELECTRICALLY OPERATED MUSIC
CUING SYSTEM
Dorothea M. Weitzner, 8 E. 62nd St.,
New York, N.Y. 10021
Filed July 26, 1965, Ser. No. 474,548
13 Claims. (Cl. 84—485)

ABSTRACT OF THE DISCLOSURE

An electrically operated music cuing system especially adapted for operation in connection with a musical instrument. The invention consists of apparatus for displaying and cuing music in connection with a manually played string instrument in which playing of the instrument is coordinated with the display. A music display device is provided including a cabinet in which a music scroll is supported on rollers and is carried past a viewing window. The music scroll comprises notes on musical staves constituting a music selection. The notes are inscribed on the front side of the web wound up and forming the music scroll.

Narrow electrically conductive stripes of metallic ink are provided on the rear side of the web. The stripes have lengths corresponding to the positions of the notes on the staves. The lengths of the stripes and their positions constitute a musical code. The stripes are decoded by means of a code reading head including wiper contacts which sense the conductive stripes. The wiper contacts are connected in circuit with a cuing display device forming part of the apparatus. The web is motor driven the motor being connected in an interlock circuit with switching means provided in a musical instrument, such as a guitar or the like.

---

The present invention is directed at apparatus for displaying and cuing music in connection with a manually played string instrument or wind instrument in which playing of the instrument is coordinated with the display. According to the invention, there is provided a music display device including a cabinet in which a music scroll is supported on rollers or reels and is carried past a viewing window. A music selection consisting of notes on musical staves is inscribed on the front side of the web wound up and forming the music scroll. The notes may be accompanied by words inscribed near the musical staves. On the rear side of the web are electrically conductive narrow stripes of metallic ink. These stripes have lengths corresponding to positions of the notes on the staves. The lengths of the stripes and their positions constitute a musical code. The stripes are decoded by means of a code reading head including wiper contacts which sense the conductive stripes. The wiper contacts are connected in circuit with a cuing display device forming part of the apparatus. The web is driven by means of a drive motor in the cabinet. This motor is connected in an interlock circuit with switching means provided in a musical instrument. This instrument may be a guitar, mandolin, banjo, or any other fretted string instrument. Alternatively, the instrument may be a clarinet, oboe, bassoon, cornet, bulge, tuba, horn, trumpet, saxophone or any other wind instrument played by manipulation of keys.

The cuing lamp display device is housed in a separate elongated box or cabinet adapted to be attached to the instrument in such a position that can be seen by the player. The cuing lamp display device has an assemblage of lamps to be viewed at the front of the device. These lamps are connected in circuit with the wiper contacts. Each lamp is connected to a particular pair of wiper contacts so that this lamp will light up when its associated wiper contacts contact a particular metallic stripe on a music web.

When the apparatus is turned on, the music web will be drawn at a constant speed across the viewing window of the music display device.

The player reading the music will be cued as to the notes to be played by the successive lighting of one or more lamps on the associated cuing lamp display device. The length of time each lamp lights determines the length of time a particular note is to be played. The music display device is provided with means for adjusting the speed of travel of the music web. This constitutes a tempo adjustment feature.

The interlock circuit including the switches or switching means at the music instrument is arranged so that the light lamp corresponding to any particular musical note must be played on the instrument or else the motor which drives the web will stop; the web will not advance and the lamp will remain lighted until the indicated note is played. The interlock circuit is provided with a by-pass switch so that is can be deactivated temporarily in the event that the player desires to advance the web to some other playing position. The interlock system includes time delay relays in the power supply circuit of the motor. These relays operate to delay stopping of the motor for a predetermined time to give the player time to play the note indicated by the lighted lamp. If the player does play the note before the expiration of this predetermined time, then the time delays are not actuated and the power supply circuit remains closed so that the motor continues to drive the web across the viewing screen or panel of the music display device and successive corresponding lamps light up. If two or more lamps light up simultaneously all the indicated notes must be played. The interlock circuit may include instant acting relays in circuit with the switching means and time delay relays to respond instantly when a note is played to keep the time delay relays from interrupting the power supply circuit of the drive motor. By this arrangement the player is disciplined to play the cued keys or strings in the order indicated by the lighted cuing lamps and may not skip them unless the deactivating, by-pass switch is operated.

The cuing lamp display device can be embodied directly in the neck or body of the musical instrument. In this arrangement the musical instrument itself serves as the cabinet in which the lamps are housed. The lamps are visible through a transparent wall of the instrument. The lamps are disposed in positions aligned with strings or keys of the instrument.

It is therefore a principal object of the invention to provide a music cuing system including a music display device, a cuing lamp display device and a musical instrument having playing members provided with switching means for stopping change of the music display and change of lamp display unless playing members indicated by lighted lamps are played.

A further object is to provide a system as described, wherein the music display device includes a web driven by motor means in the device, the motor means being in an interlock circuit with the switching means at the playing members.

Another object of the invention is to provide a musical instrument having electrically conductive strings and electrically conductive individual frets arranged for closing an electric circuit when any particular string is pressed against any particular fret, for use in a music display and cuing system.

A further object is to provide a musical instrument having manually operable keys with associated switches arranged for operating an electric circuit in a music display and cuing system.

Another object is to provide a musical instrument having manually operable keys or strings, with cuing lamps embodied in a part of the instrument adjacent the keys or strings to indicate which keys or strings are to be played.

A further object is to provide a music cuing system including a musical instrument as last described and an associated music display device connected in circuit with the lamps for lighting the same in accordance with music notes displayed by the music display device.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure.

Figure 1:
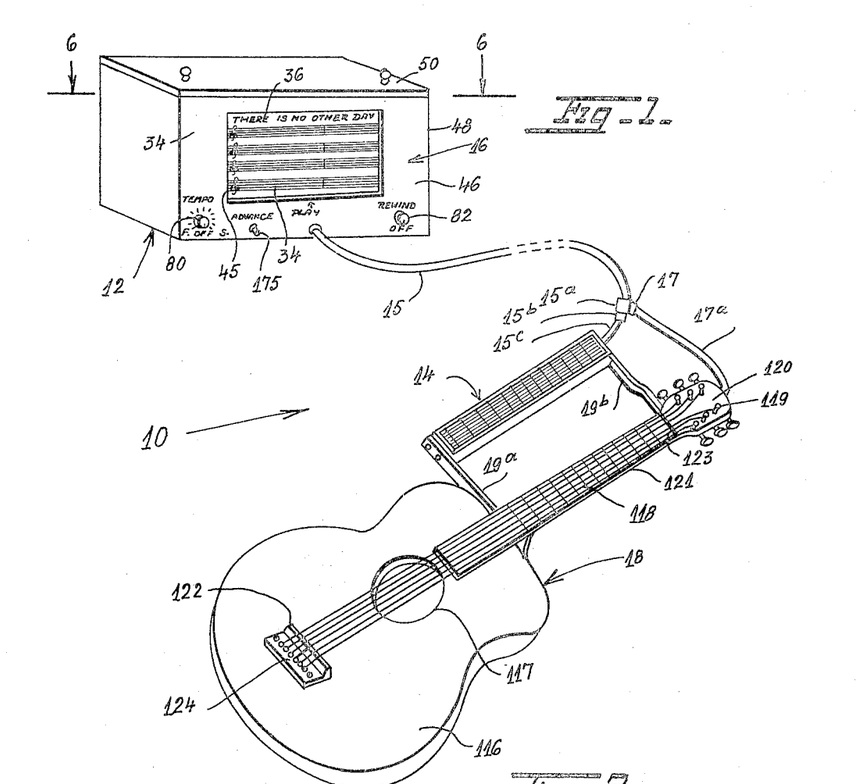
FIGURE 1 is a perspective view of a music display and cuing system including a musical instrument, lamp display device and music display device.

Referring first to FIG. 1, there is shown a music cuing system 10 including a music display device 12, a cuing lamp display device 14 and a musical instrument 18. A flexible cable 15 of any desired length extends from device 14 and terminates in a socket 15a. Plug 15b at the end of a cable 15c is connected to device 14. Plug 17 at the end of a cable 17a is connected to the instrument 18.

The device 12 can be mounted on a suitable music stand close to a player of instrument 11. The device 14 is mounted by means of brackets 19a, 19b on the instrument 18.

Figures 11, 12:
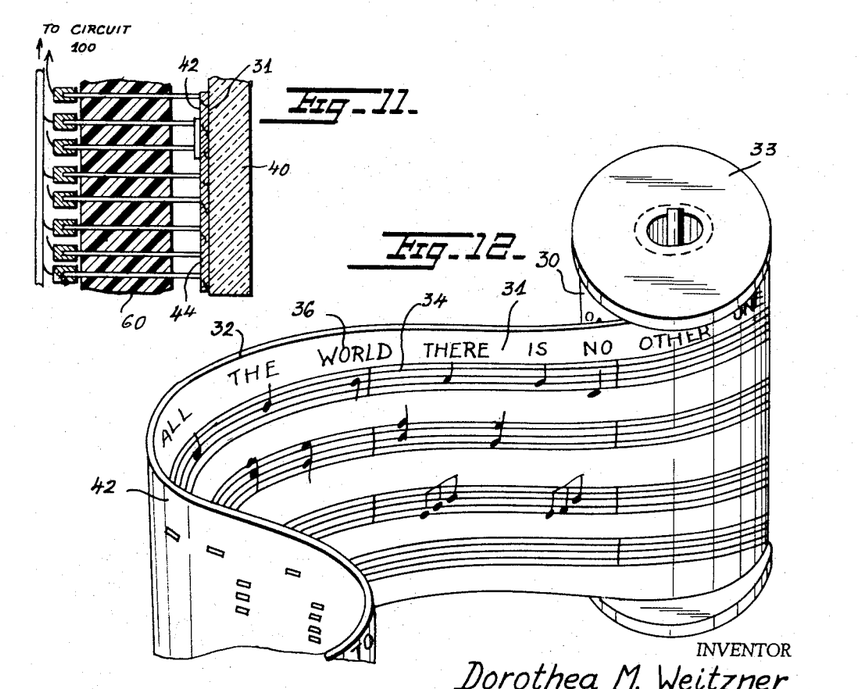
FIG. 11 is an enlarged fragmentary sectional view of the music decoding head shown in operating position with an associated music web.
FIG. 12 is a fragmentary perspective view of a music roll with part of one end of the web or sheet extended therefrom.

The music display device 12 is shown to best advantage in FIGS. 1, 6, 7 and 8 to which reference is now made. This device is housed in a rectangular cabinet 16. The cabinet is adapted to support a music scroll 30 for unwinding and displaying a web 32. The web is a wide sheet of paper, plastic or cloth of extended length wound up on reel 33 to form scroll 30. On the front side of web 32 as best shown in FIG. 12 are imprinted horizontal music staves 34. As many as eight staves may be provided. Above the staves may be imprinted words 36 for which corresponding notes 38 appear on the staves. Notes 38 appear on a plurality of staves and may represent a voice part to be sung with an accompaniment by instrument 11. The music selection appears at transparent viewing window 40 in the front of the cabinet.

At the rear side 42 of the music web are narrow horizontal electrically conductive stripes 44 corresponding respectively to the notes appearing at the other side 31. Each stripe has a predetermined length, ranging from the smallest corresponding to a 1/128 note to a maximum length corresponding to one or more whole notes. The positions of the stripes transversely of the web between top and bottom edges correspond to the pitches of the respective notes inscribed on the staves. The stripes may be metallic, copper or aluminum or other conductive substance Window 40 is mounted in a rectangular opening 45 in the front wall 46 of the cabinet. The cabinet 16 has fixed end walls 48 and a bottom 49. A horizontal top panel 50 is integrally joined to a vertical back panel 52. Back panel 52 is joined at its lower edge by a hinge 54 to the rear edge of bottom 49. The cabinet can be opened at the top and back by tilting the cover defined by panels 50, 52 rearwardly away from the end and front walls as shown by dotted lines in FIG. 7. This provides access to the interior of the cabinet for loading a scroll and for servicing the several components inside the cabinet.

The music decoding head 60 is a vertically disposed insulated bar in which are parts of vertically spaced springy wires 62, see FIGS. 6, 7, 9–11. The wires have flexible ends outside the bar with tips 63 turned forwardly to contact the electrically conductive stripes 44 on the back of web 32. Rear ends of wires 62 are connected in a circuit 100 shown in FIG. 13. A different pair of wires contact the back of web 32 on each different level. Two wires simultaneously wipe each stripe; see FIG. 11. Head 60 is supported by a bracket 61 on the cabinet bottom.

The web 32 is rolled up to form scroll 30 on supply reel 33 which is carried by axially vertical keyed shaft 66 of rewind motor 68 on the cabinet bottom 49. The web 32 is entrained around axially vertical right idler roller 70 located at the rear side of window 40. The web extends in a vertical plane along the window and passes rearwardly around axially vertical idler roller 72 located at the back of the window at the left end of the cabinet; see FIG. 6. Rollers 70 and 72 are both resilient members. They are supported on shafts 71, 73 carried by fixed bearings 74 on cabinet bottom 49. Rollers 70, 72 hold the paper smooth, flat and taut at the back of the window and in front of head 60.

Web 32 passes between an axially vertical capstan roller 75 and an axially vertical idler pressure roller 76. The capstan roller is mounted on shaft 77 of drive motor 78. This motor drives the capstan at constant speed so that the web is pulled across the window 40 at a speed determined by the setting of speed control 80 connected to the motor. The speed control is located at the front wall 46 of the cabinet and has its several settings marked from fast to slow by graduations on wall 46; see FIG. 1.

Another control 82 is also located at the front of the cabinet. This control turns rewind motor 68 on and off for rewinding the web from reel 84. Reel 84 is takeup reel carried on a keyed shaft 86 mounted in bearing 88 on the bottom of the cabinet; see FIGS. 6 and 8. On shaft 86 is a pulley 89 driven by an endless belt or cord 90 entrained on drive pulley 92 carried by drive shaft 77. The web winds up on reel 84 which is driven by motor 78 via drive belt 90. The belt 90 will slip on pulleys 89 and 92 while the capstan roller 75 turns at constant speed to keep the web winding up at constant speed on the reel 84 instead of winding up faster and faster as it would otherwise tend to do.

Batteries 95 which are replaceable and may be rechargeable are provided in the cabinet. The batteries are connected to the motors 68 and 78 for driving the same. The motors, batteries and controls are connected in an electric circuit 100 which is explained below in connection with FIG. 13.

Figures 2, 5:
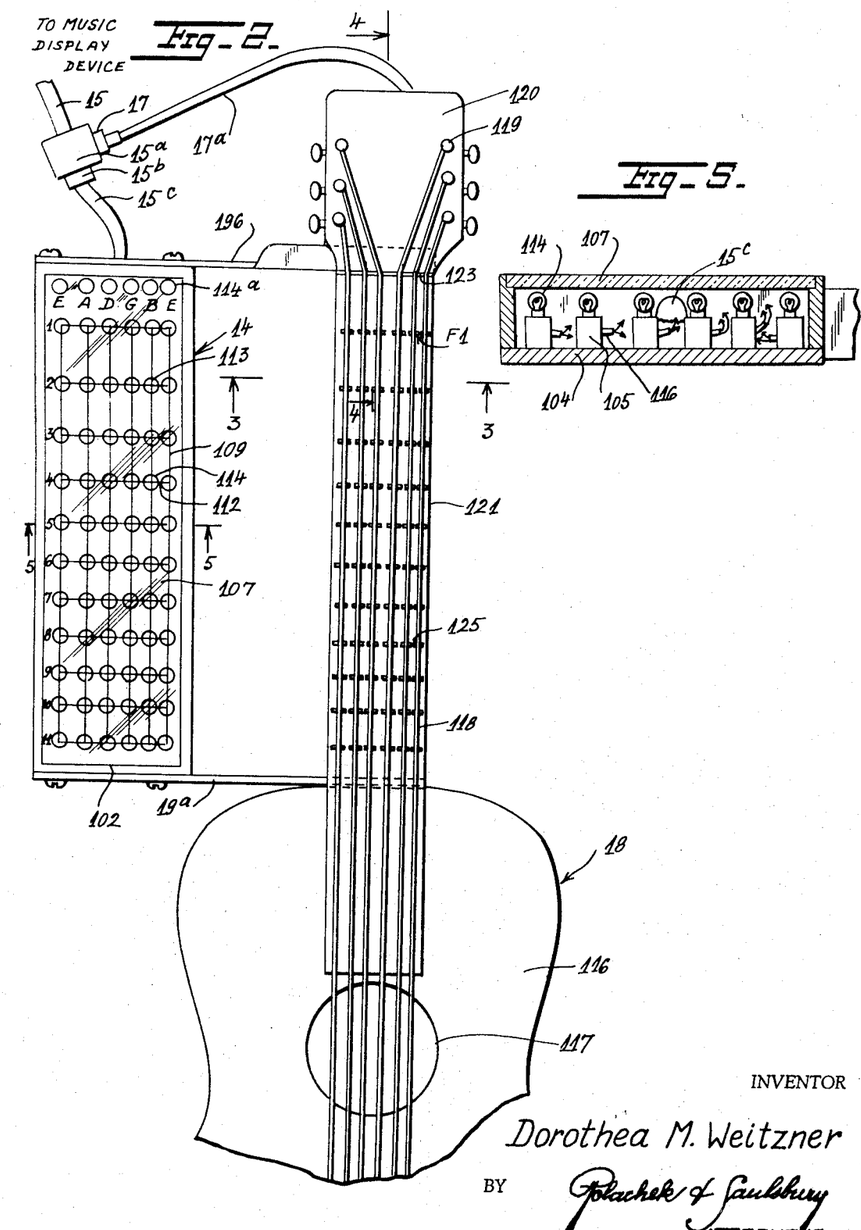
FIG. 2 is an enlarged plan view of the lamp display device and part of the musical instrument of FIG. 1.
FIG. 5 is an enlarged cross sectional view taken on line 5—5 of FIG. 2.

The cutting lamp display device 14 shown in FIGS. 1, 2, 5, includes a long rectangular cabinet 102 having a removable bottom wall 104 providing access to the interior of the cabinet. On wall 104 is mounted a plurality lamp assemblies 105. Each lamp assembly carries a lamp 114 connected by wires 116 and cable 15c in circuit 100 referred to above. Fitted into the open top of the cabinet is a transparent window or panel 107. On the panel is inscribed a gridwork pattern of vertical or longitudinal lines 109 intersected by transverse lines 112. Lamps 114 are located at intersections 113 of the lines. These points of intersection and the associated lamps correspond respectively to note playing parts of the musical instrument as well as to specific lines and spaces on the music staves 34 on web 32. Brackets 19a and 19b are attached to opposite ends of the cabinet and support the device 14 on instrument 18 in position to be viewed by the player thereof.

Figure 3:
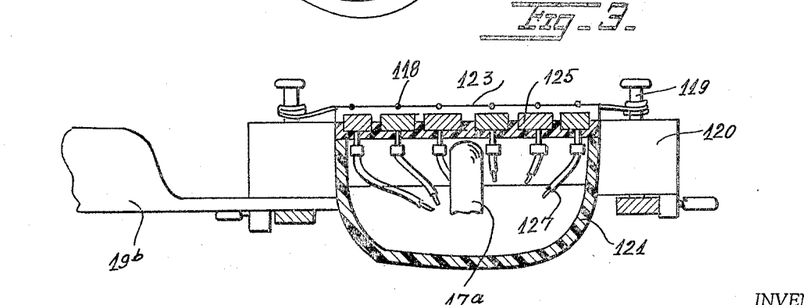
FIG. 3 is a further enlarged cross sectional view taken on line 3—3 of FIG. 2.
Figure 4:
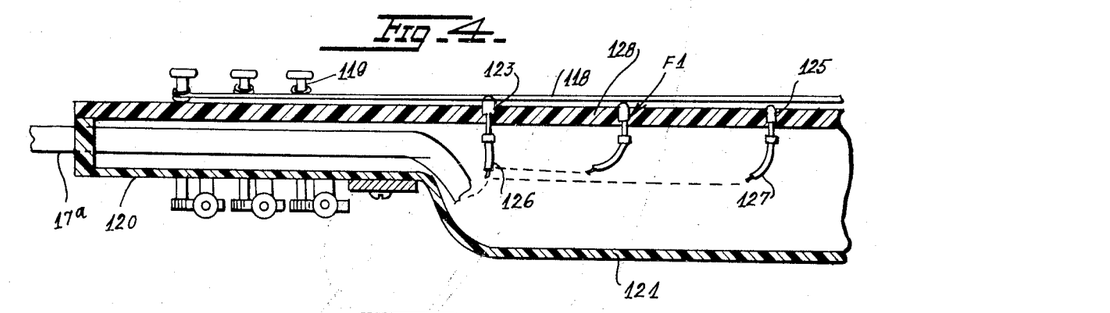
FIG. 4 is a fragmentary enlarged longitudinal sectional view taken on line 4—4 of FIG. 2.
Figure 6:
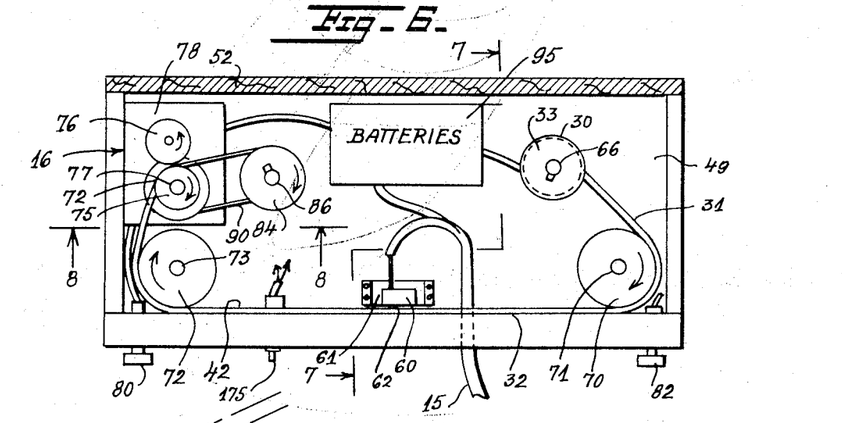
FIG. 6 is an enlarged horizontal sectional view through the music display device, taken on line 6—6 of FIG. 1.
Figure 7:
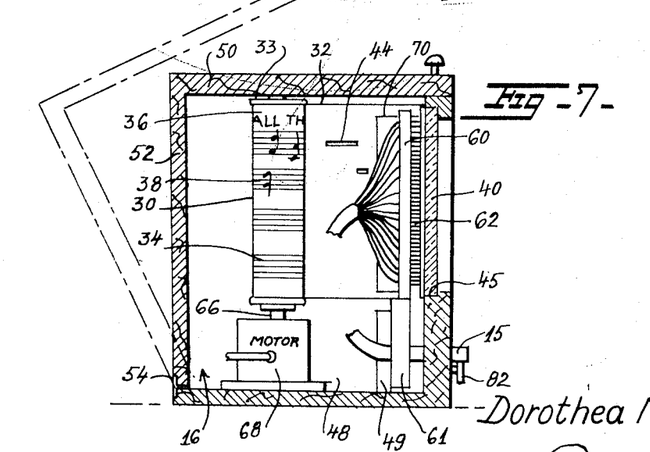
FIG. 7 is a vertical cross sectional view taken on line 7—7 of FIG. 6.
Figure 8:
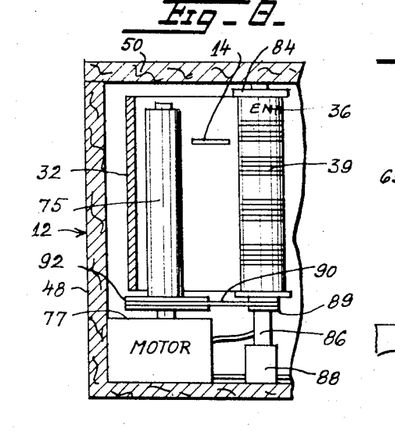
FIG. 8 is a fragmentary vertical sectional view taken on line 8—8 of FIG. 6.
Figure 9:
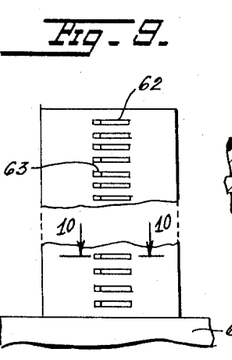
FIG. 9 is an enlarged front view of a music decoding head, parts being broken away.
Figure 10:
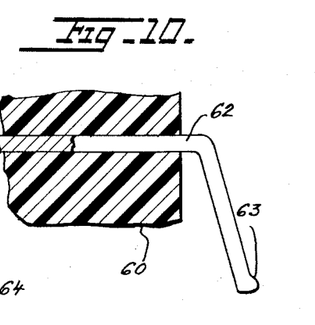
FIG. 10 is a greatly enlarged, fragmentary sectional view taken on line 10—10 of FIG. 9.

The musical instrument 18 is a guitar. This string instrument is shown only for purposes of illustration and it will be understood that any other type of guitar or other fretted string instrument can be substituted. The instrument 18 has a body 116 with round sound hole 117. Metal strings 118 extend from pegs 119 at the scroll 120 longitudinally of the neck 121 and body 116 to anchoring block 124. The strings pass over a bridge 122 near block 121 and over a transverse nut 123 at the upper end of neck 121. The nut and bridge serve to support the strings and to space them slightly from transversely disposed frets 125 under the strings. To the extent described the instrument 18 is substantially conventional. Now according to the invention, the neck 121 is a hollow member; see FIGS. 3 and 4. The neck 121 is a metal bar or strip which is electrically conductive and to which a wire 126 is connected. The frets 125 are individual metal strips or plates. Six frets are disposed in alignment and spaced apart in each transverse fret position across the upper insulation wall 128 of the neck. The sets of frets are spaced apart longitudinally of the neck. As in any conventional guitar, a note is played by plucking any particular string with one hand while the string is pressed down on any particular fret. The first line of frets F1 are employed for playing notes in the "first" string positions. Full string or "open string" notes "E, A, D, G, B, E" are indicated by the first line of lamps 114a on the panel 107 of cuing lamp device 14. A wire 127 is connected to each fret. The wires 126 and 127 are enclosed in cable 17a. The frets are connected in circuit 100 shown in FIG. 13 to which reference is now made.

Figure 13:
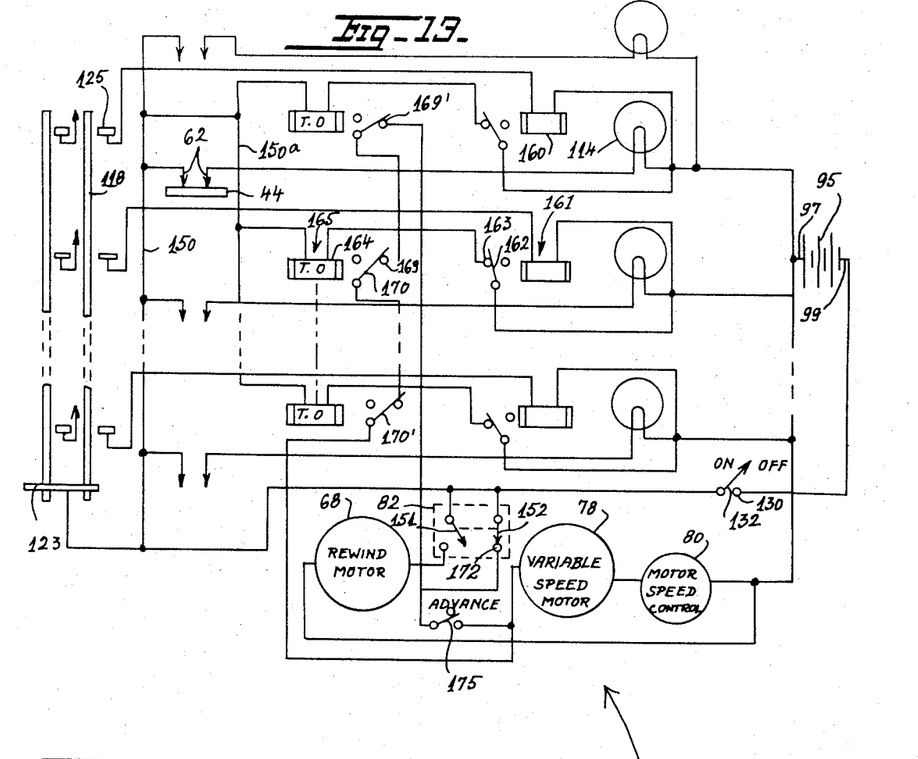
FIG. 13 is a simplified diagram of the electrical circuit of the system.

Referring now to circuit 100 shown in FIG. 13, the batteries 95 have one terminal 97 connected to one terminal of each of the lamps 114. The other terminal 99 of the batteries is connected to terminal 130 of switch 132. This switch is physically embodied in the motor speed control switch 80. When the switch 132 is open the motor 78 is deenergized and all the lamps 114 are turned off. The other terminal of each lamp is connected to one wiper contact 62 of a pair thereof. The other wiper contact is connected to line 150 which is connected via switch 132 to battery terminal 99. Motor 78 is connected between line 150 and speed control 80. Rewind motor 68 has one terminal connected to battery terminal 97. The other terminal of motor 68 is connected to motor control switch 82. Motor control switch 82 is a double pole switch. One pole 151 is open when the other pole 152 is closed and vice versa. When switch 132 is open, both motors are off.

In operation of circuit 100, when a conductive strip 44 which is a music code element bridges a pair of wiper contacts 62 which constitute a music note decoding element, the associated lamp 114 lights up. The lamps are arranged in a pattern corresponding to the pattern of frets 125 on neck 121 so that the player will be cued as to which string to press down on which fret.

The system includes an interlock circuit to insure that the player pressed the proper strings down on the proper frets. This interlock circuit includes the frets 125 each of which is connected to a coil 160 of a different instant acting relay 161. This relay has a pair of normally closed contacts 162, 163. Contact 162 is connected to one terminal of an associated lamp 114. Contact 163 is connected to coil 164 of a time delay relay 165. Relay 165 has normally closed contacts 169, 170. All the contacts of all the relays 165 are connected in series with each other. The first contact 169' is connected to switch terminal 152 in switch 82. The last contact 170' is connected to one terminal of variable speed motor 78. All the strings 118 are in continuous contact with nut 123 which is connected to wire 150. One terminal of each coil 164 is connected to common wire 150a connected in turn to wire 150. No frets or relays are connected in circuit with lamps 114a.

The time delay relays 165 are designed to open contacts 169, 170 after a predetermined time delay of about one half second when after the coils 164 are energized and to close the contacts 169, 170 in not more than one tenth of a second after the relay coil becomes deenergized.

In operation of the interlock circuit, one or more relay coils 164 will become energized when any one or more lamps 114 light up. If a player does not then press a string or strings down on the fret or frets corresponding to the lighted lamp or lamps, one or more pairs of contacts 169, 170 will open after one half second. The power supply circuit of motor 78 will be opened so that the motor stops and drive of web 32 will be halted.

If then the player belatedly presses all the designated strings down on all the designated frets, relays 160 will be energized to open the circuits of the energized time delay relays. The open contacts 169, 170 will then close and drive of motor 78 will resume. If the player does press the designated strings down on the designated frets before the expiration of the half second period, contacts 169, 170 will not open and the power supply of motor 78 will not be interrupted.

The rewind motor 68 is independent of this operation and operates when switch poles 151, 152 are thrown to the alternate position from that shown in FIG. 13.

ADVANCE switch 175 is provided on the front of the music display device 12. This normally open switch is connected directly across relay contacts 169', 170' to by-pass the interlock circuit and keep the motor 78 operating if switch 175 is closed. This permits the web 32 to be advanced to any desired position in device 12 even though the instrument is not played while the lamps 114 light up.

When the chromatic naturals E, A, D, G, B, E are to be played on open strings lamps 114a will light up. Since the interlock circuit does not include these lamps, the advance of the web will not stop if these notes are not played. If it is desired that the interlock circuit include the playing of the chromatic naturals, then the first line of frets F1 should be assigned to playing chromatic naturals and the player will finger the strings at these first frets to play the chromatic naturals.

Figure 14:
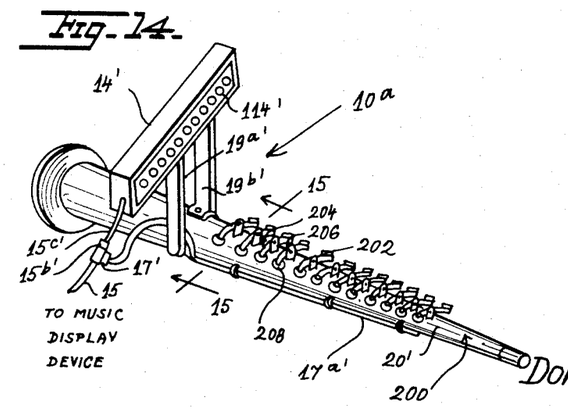
FIG. 14 is a perspective view of parts of another music display and cuing system including another musical instrument and lamp display device.
Figure 15:
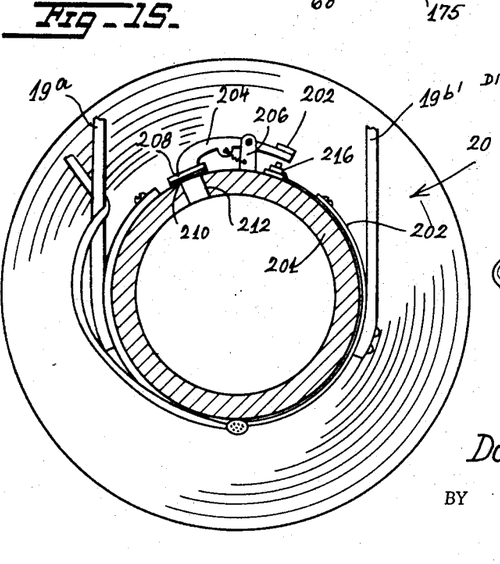
FIG. 15 is an enlarged cross sectional view taken on line 15—15 of FIG. 14.

In FIGS. 14 and 15 the invention is shown in system 10a adapted to use with a key operated horn type instrument 200 such as a clarinet, oboe or the like. Parts of the system corresponding to those of system 10 are identically numbered. The instrument 200 has a hollow body 201 with playing keys 202. The keys are mounted on levers 204 pivotally supported on ears 206. At ends of the levers are heads 208 covered with felt 210. The heads 208 fit snugly over holes 212 in the body of the instrument; to the extent described the instrument is conventional. Microswitches 216 are disposed on the body of the instrument under the keys 202 and are operated when the keys are pressed for playing notes designated by lamps 114' on cuing lamp display device 14'.

Device 14' is arranged in a manner similar to device 14 with a long cabinet supported by brackets 19a' and 19b' on the body of the instrument in position for viewing the lamps 114' by the player. The device 14' is connected via cable 15c' and plug 15b' to cable 15 of the music display device 12. All the switches 216 are connected via wires 220 to cable 17a' which terminate in plug 17' connected to cable 15.

The player using system 10a must press the keys 202 corresponding to the light lamps 114' which in turn correspond to notes indicated on the front of web 32 and to coded elements on the back of the web sensed by elements 62.

Figure 16:
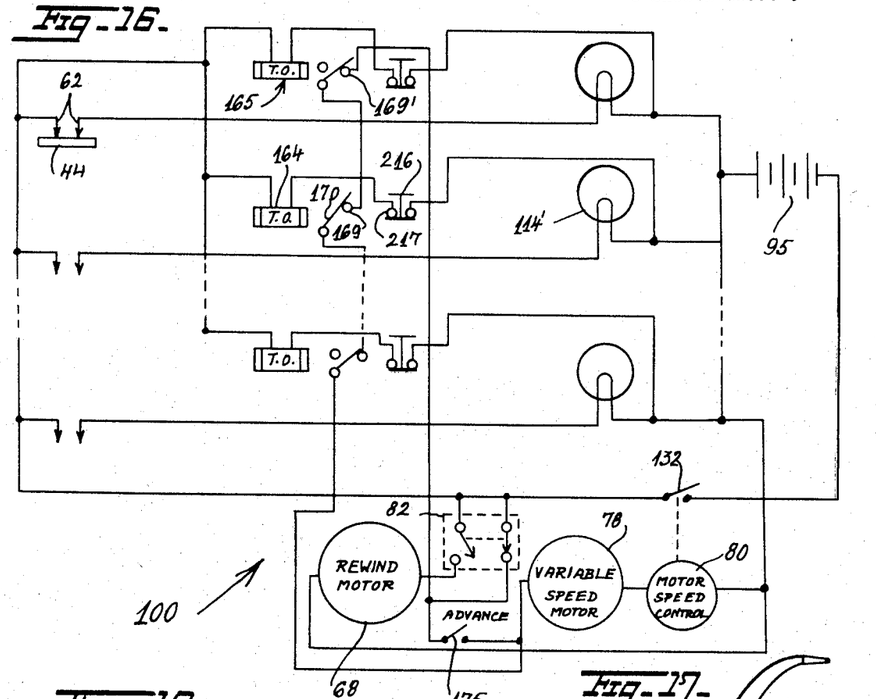
FIG. 16 is a diagram of the electrical circuit of the system of FIG. 14.

FIG. 16 shows circuit 100' of the system 10a. Parts corresponding to those of circuit 100 are identically numbered. It will be noted that microswitches 216 have normally closed contacts 217 in series circuit with the coils 164 of time delay relays 165. Relay contacts 169, 170 are connected in an interlock circuit with motor 78. If any key 202 designated by a lighted lamp 114' is not pressed within one half second, the associated relay coil 164 opens the closed contacts 169, 170 and the motor 78 stops. If then the key is pressed, the relay becomes deenergized and the power supply circuit of the motor 78 is closed to continue driving the motor and advancing the web.

If a designated key is pressed before the expiration of the predetermined time delay period, then switch 216 opens and the energized coil of relay 165 remains deenergized. Thus as the contact wiper elements 62 encounter any one or more coded elements 44, the lamps will light and the player must press the appropriate keys. If he does this the web drive will not be interrupted.

Advance switch 175 serves to by-pass the interlock circuit and permit the web 32 to be advanced independently of the lighted lamps and playing of the keys.

Figure 17:
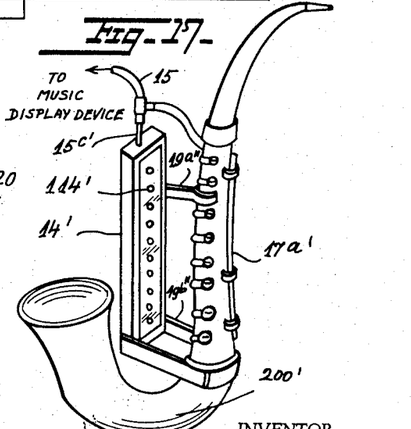
FIG. 17 is a perspective view of parts of still another music display and cuing system including another musical instrument and lamp display device.

FIG. 17 shows parts of another system 10b which employs cuing lamp display device 14' supported by brackets 19a" and 19b" on another key operated wind instrument 200' such as a saxophone or the like. This device along with the switches operated by the keys of the instrument will be connected in circuit 100' shown in FIG. 16. The explanation of operation of system 10a will thus suffice for system 10b.

Figure 18:
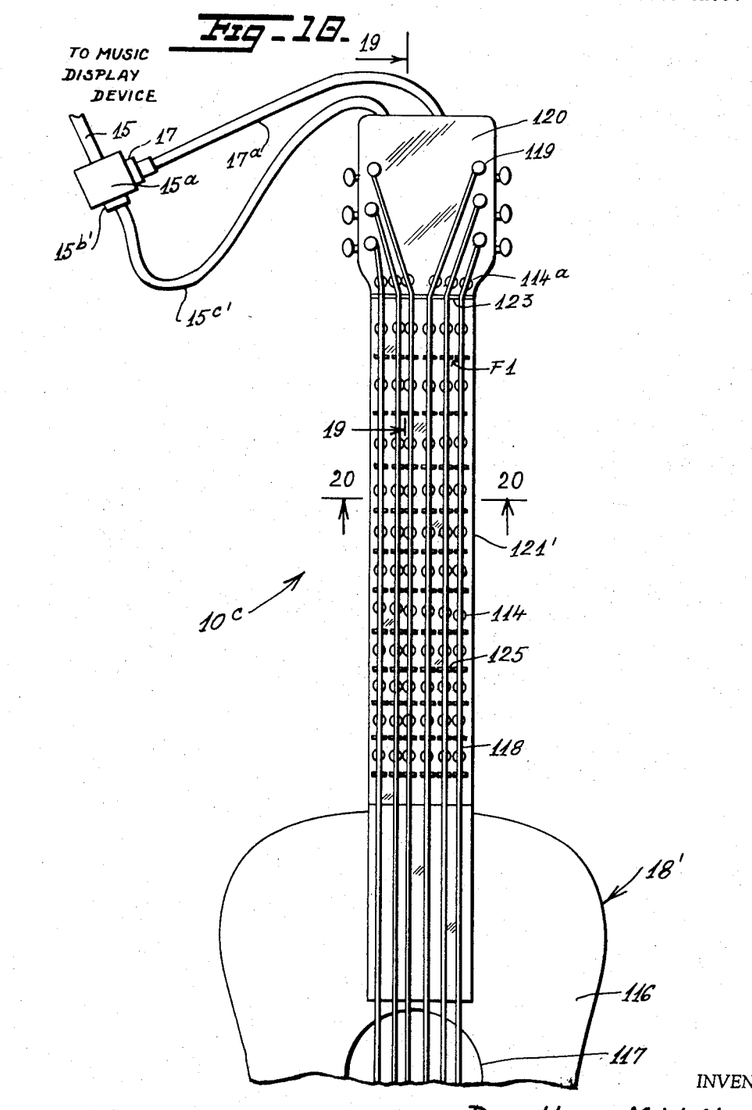
FIG. 18 is a fragmentary plan view similar to a part of FIG. 2, showing a portion of a musical instrument with lamp display means embodied therein.
Figure 19:
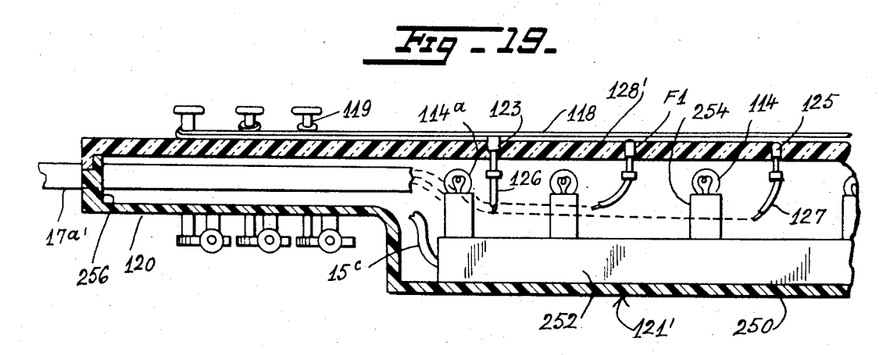
FIG. 19 is an enlarged cross sectional view taken on line 19—19 of FIG. 18.
Figure 20:
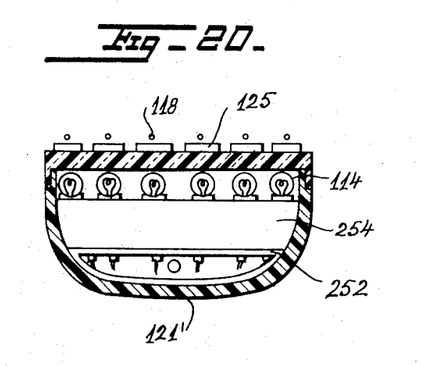
FIG. 20 is an enlarged cross sectional view taken on line 20—20 of FIG. 18.

In FIGS. 18–20 are shown parts of a system 10c including another guitar 18' embodying another form of the invention; parts of instrument corresponding to instrument 18 and having the same functions are identically numbered. Guitar 18' has a hollow neck 121' with an upper transparent wall 128' removably fitted upon an opaque plastic base 250. The wall 128' is preferably made of transparent plastic such as an acrylic or the like. Frets 125 and nut 123 are embedded in wall 128' in the same manner as in neck 121 of guitar 18. The strings 118 extend over wall 128' and are normally spaced from the frets.

Inside the neck on the bottom wall of the base 250 is mounted a circuit box 252. On this box is a plurality of lamp supports 254 disposed transversely of the neck and spaced apart longitudinally of the neck. On each of the lamp supports are six lamps 114 or 114a all connected in circuit with a music display device such as the device 12 previously described.

The lamps are connected to the music display device via a cable 15c'. This cable terminates at plug 15b' inserted into socket 15a at the end of cable 15. Cables 15c' and 17a pass out of the neck 121' through the end wall 256 of the base 250. The lamps 114 are centered under the strings 118 between each pair of frets. Each lamp indicates the point where the player must press down a string to contact an adjacent fret for playing a particular note indicated by a lighted lamp and also indicated by the music display device 12. Open strings to be played are indicated by lamps 114a located beyond nut 123.

It will be apparent that the lamp display device 14 of system 10 has been replaced by a lamp display device physically embodied in the neck 121' of instrument 18' and providing the advantage that the exact points where the strings are to be manipulated are indicated by lamps on the neck underlaying the strings. In addition, the attachment of a supplementary cabinet supporting lamps such as device 14 is avoided. The circuit 100 of system 10 shown in FIG. 13 applies to the system 10c without change so that the explanation of operation of this system 10 applies equally to system 10c and need not be repeated.

The systems described will be found valuable for students in learning to sight read music, in instrument playing practice, in progressively gaining speed and accuracy in playing and in many other ways.

What is claimed is:

1. Apparatus for displaying and cuing music comprising a first support, a display window mounted in a fixed vertical position on said support, means for movably supporting and carrying a web in a vertical position on said support, horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit interconnecting said switch means and said motor drive means, so that the motor drive means stops driving said web predetermined time after any one lamp lights up unless the playing member corresponding to a lighted lamp is played before expiration of said predetermined time, and whereby said motor drive means resumes driving said web when the playing member corresponding to the lighted lamp is played after the drive of the web stops, said musical instrument being a string instrument, said playing members being a plurality of electrically conductive strings, said switch means being a plurality of individual electrically conductive frets slightly spaced apart from the strings and disposed along the strings for contact by the strings when the strings are pressed.

2. Apparatus for displaying and cuing music, comprising a first support, a display window mounted in a fixed vertical position on said support, means for movably supporting and carrying a web in a vertical position on said support, horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, a circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit interconnecting the said switch means and said motor drive means, so that the motor drive means stops driving said web predetermined time after any one lamp lights up unless the playing member corresponding to a lighted lamp is played before expiration of said predetermined time, and whereby said motor drive means resumes driving said web when the playing member corresponding to the lighted lamp is played after the drive of the web stops, said musical instrument being a wind instrument, said playing members being manually operable keys, said switch means being individual switches located adjacent to the keys for actuation thereby respectively.

3. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements connected in an interlock circuit with said motor drive means so that the motor drive means stops driving said web a predetermined time after any one lamp lights up unless a particular string is pressed against a particular fret before the expiration of said predetermined time, and whereby said motor drive means resumes driving said web when the said particular string is pressed against said particular fret after the drive of the web stops.

4. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements connected in an interlock circuit with said motor drive means so that the motor drive means stops driving said web a predetermined time after any one lamp lights up unless a particular string is pressed against a particular fret before the expiration of said predetermined time, and whereby said motor drive means resumes driving said web when said particular string is pressed against said particular fret after the drive of the web stops, said interlock circuit further including a manually operable switch for by-passing said strings and frets to keep said motor drive means operative to advance the web independently of the lighting of the lamps and of the manipulation of the strings.

5. Apparatus for displaying and cuing music, comprising a first support, a display window mounted in a fixed vertical position on said support, means for movably supporting and carrying a web in a vertical position on said support, horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, a circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit interconnecting the said switch means and said motor drive means, so that the motor drive means stops driving said web predetermined time after any one lamp lights up unless the playing member corresponding to a lighted lamp is played before expiration of said predetermined time, and whereby said motor drive means resumes driving said web when the playing member corresponding to the lighted lamp is played after the drive of the web stops, said musical instrument being a wind instrument, said playing members being manually operable keys, said switch means being individual switches located adjacent to the keys for actuation thereby respectively, said interlock circuit further including a manually operable switch for by-passing said switch means to keep said motor drive means operative to advance the web independently of the lighting of the lamps and the playing of said playing members.

6. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit including a plurality of time delay relays in a power supply circuit with said lamps and with said motor drive means, so that the relays open the power supply circuit to stop said motor drive means and stop web a predetermined time after any one lamp lights up unless the playing member corresponding to a lighted lamp is played before expiration of said predetermined time, and whereby said motor drive means resumes driving said web when the playing member corresponding to the lighted lamp is played after drive of the web stops.

7. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit including a plurality of time delay relays in a power supply circuit with said lamps and with said motor drive means, so that the relays open the power supply circuit to stop said motor drive means and stop web a predetermined time after any one lamp lights up unless the playing member corresponding to a lighted lamp is played before expiration of said predetermined time, and whereby said motor drive means resumes driving said web when the playing member corresponding to the lighted lamp is played after drive of the web stops, said interlock circuit further including a manually operable switch for by-passing said switch means to keep said motor drive means operative to advance the web independently of the lighting of the lamps and the playing of said playing members.

8. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head, a second support, a plurality of lamps carried by said second support, said decoding head having a plurality of decoding elements disposed in uniformly spaced aray, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements, and interlock circuit including a plurality of time delay relays and instant acting relays in a power supply circuit with said lamps and with said motor drive means, so that the time delay relays open the power supply circuit to stop said motor drive means and stop said web a predetermined time after any one lamp lights unless a particular fret, each fret being connected in circuit with one of said instant acting relays to effect closing of said power supply circuit and restarting of said motor drive means when said particular string is pressed against said particular fret after the drive of the web stops, each of the instant acting relays being effective to hold an associated time delay relay deenergized to keep the power supply circuit closed and the motor drive continuing when said particular string is pressed against said particular fret before the expiration of said predetermined time.

9. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head, a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements, an interlock circuit including a plurality of time delay relays and instant acting relays in a power supply circuit with said lamps and with said motor drive means, so that the time delay relays open the power supply circuit to stop said motor drive means and stop said web a predetermined time after any one lamp lights unless a particular fret, each fret being connected in circuit with one of said instant acting relays to effect closing of said power supply circuit and restarting of said motor drive means when said particular string is pressed against said particular fret after the drive of the web stops, each of the instant acting relays being effective to hold an associated time delay relay deenergized to keep the power supply circuit closed and the motor drive continuing when said particular string is pressed against said particular fret before the expiration of said predetermined time, said interlock circuit further including a manually operable switch for by-passing said string and frets to keep said motor drive means operative to advance the web independently of the lighting of the lamps and of the manipulation of the strings.

10. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit including a plurality of time delay relays in a power supply circuit with said lamps and with said motor drive means, so that the relays open the power supply circuit to stop said motor drive means and stop web a predetermined time after any one lamp lights up unless the playing member corresponding to a lighted lamp is played before expiration of said predetermined time, and whereby said motor drive means resumes driving said web when the playing member corresponding to the lighted lamp is played after drive of the web stops, said musical instrument being a wind instrument, said playing members being manually operable keys, said switch means being individual switches located adjacent to the keys for actuation thereby respectively.

11. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when an associated decoding element senses the presence of one of said music code elements on the other side of said web, a musical instrument having a plurality of manually operable playing members for playing notes corresponding to respective lighted lamps, switch means operated by each of the playing members, and an interlock circuit including a plurality of time delay relays in a power supply circuit with said lamps and with said motor drive means, so that the relays open the power supply circuit to stop said motor drive means and stop web a predetermined time after any one lamp lights up unless the playing member corresponding to a lighted lamp is played before expiration of said predetermined time, and whereby said motor drive means resumes driving said web when the playing member corresponding to the lighted lamp is played after drive of the web stops, said musical instrument being a wind instrument, said playing members being manually operable keys, said switch means being individual switches located adjacent to the keys for actuation thereby respectively, said interlock circuit further including a manually operable switch for by-passing said switch means to keep said motor drive means operative to advance the web independently of the lighting of the lamps and the playing of said playing members.

12. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head; a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements connected in an interlock circuit with said motor drive means so that the motor drive means stops driving said web a predetermined time after any one lamp lights up unless a particular string is pressed against a particular fret before the expiration of said predetermined time, and whereby said motor drive means resumes driving said web when the said particular string is pressed against said particular fret after the drive of the web stops, and means for mounting said second support on said instrument adjacent to said playing members for simultaneous viewing of said lamps and playing members.

13. Apparatus for displaying and cuing music, comprising a first support, a display window mounted in a fixed vertical position on said support, means for movably supporting and carrying a web in a vertical position horizontally along said window for displaying music notes inscribed on one side of the web through said window, motor drive means for driving said web, a decoding head supported adjacent to said window for sensing code elements on the other side of said web, said elements corresponding to the notes on the one side of the web passing said decoding head, a second support, a plurality of lamps carried by said second support, said decoding head having a plurality of decoding elements disposed in uniformly spaced array, each lamp corresponding to a different playing member to be played on a musical instrument, and circuit means interconnecting said decoding elements with said lamps respectively so that a certain lamp lights when associated decoding element senses the presence of one of said music code elements on the other side of said web, a musical instrument having a plurality of manually manipulatable strings, frets slightly spaced apart from the strings and disposed along the strings for contact by the strings when the strings are pressed for playing notes corresponding to the lighted lamps, said strings and frets being electrically conductive elements connected in an interlock circuit with said motor drive means so that the motor drive means stops driving said web a predetermined time after any one lamp lights up unless a particular string is pressed against a particular fret before the expiration of said predetermined time, and whereby said motor drive means resumes driving said web when the said particular string is pressed against said particular fret after the drive of the web stops, said second support being a circuit box, said musical instrument having a hollow neck, said circuit box being mounted in said hollow neck, said neck having a transparent upper wall underlaying said strings, said lamps being located under the strings and between the frets to indicate through said transparent upper wall the points where the strings are to be pressed down on the frets.

References Cited

UNITED STATES PATENTS 3,153,365  10/1964  Redmond __________ 84—478

FOREIGN PATENTS 370,625  1963  Switzerland.

RICHARD B. WILKINSON, *Primary Examiner.*

G. M. POLUMBUS, *Assistant Examiner.*